(12) United States Patent
Park

(10) Patent No.: US 8,930,696 B2
(45) Date of Patent: Jan. 6, 2015

(54) SYSTEM AND METHOD FOR EXCHANGING SECURE INFORMATION BETWEEN SECURE REMOVABLE MEDIA (SRM) DEVICES

(75) Inventor: Jung-Hun Park, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 1099 days.

(21) Appl. No.: 12/470,692

(22) Filed: May 22, 2009

(65) Prior Publication Data

US 2009/0292922 A1 Nov. 26, 2009

(30) Foreign Application Priority Data

May 22, 2008 (KR) .................. 10-2008-0047614

(51) Int. Cl.
*H04L 9/32* (2006.01)

(52) U.S. Cl.
CPC ............ *H04L 9/3273* (2013.01); *H04L 9/3268* (2013.01); *H04L 2209/603* (2013.01)
USPC ........... 713/169; 713/155; 713/158; 713/168; 726/5; 726/19; 726/26

(58) Field of Classification Search
CPC ................................ H04L 67/28; G06F 15/16
See application file for complete search history.

(56) References Cited

U.S. PATENT DOCUMENTS

| | | | |
|---|---|---|---|
| 7,475,247 B2 * | 1/2009 | Bade et al. ..................... | 713/169 |
| 2004/0093505 A1 * | 5/2004 | Hatakeyama et al. ......... | 713/189 |
| 2005/0160259 A1 * | 7/2005 | Ogura et al. ................... | 713/156 |
| 2006/0133615 A1 | 6/2006 | Bade et al. | |
| 2007/0157318 A1 * | 7/2007 | Lee et al. ......................... | 726/27 |
| 2007/0263869 A1 * | 11/2007 | Oh et al. ........................ | 380/255 |
| 2008/0127177 A1 * | 5/2008 | Oh et al. ........................ | 717/174 |
| 2009/0158437 A1 * | 6/2009 | Kim et al. ....................... | 726/26 |
| 2010/0017887 A1 * | 1/2010 | Kiyosawa et al. .............. | 726/26 |
| 2012/0304315 A1 | 11/2012 | Lee et al. | |

FOREIGN PATENT DOCUMENTS

KR 1020070050712 5/2007

OTHER PUBLICATIONS

"Guide to Storage Encryption Technologies for End User Devices"—NIST, Scarfone et al, Nov. 2007 http://csrc.nist.gov/publications/nistpubs/800-111/SP800-111.pdf.*

* cited by examiner

*Primary Examiner* — Randy Scott
(74) *Attorney, Agent, or Firm* — The Farrell Law Firm, P.C.

(57) ABSTRACT

A system and method for exchanging secure information between Secure Removable Media (SRM) devices. An initialization operation is performed between the SRM devices. After a mutual authentication operation is performed between the SRM devices, a secret key is exchanged for secure information exchange. An installation setup operation is then performed to establish an environment for moving rights between the SRM devices, and the rights information can be directly exchanged between the SRM devices by performing a rights installation operation between the SRM devices.

18 Claims, 3 Drawing Sheets

SYSTEM AND METHOD FOR EXCHANGING SECURE INFORMATION BETWEEN SECURE REMOVABLE MEDIA (SRM) DEVICES

PRIORITY

This application claims priority under 35 U.S.C. §119(a) to a Korean Patent Application filed in the Korean Intellectual Property Office on May 22, 2008 and assigned Ser. No. 10-2008-47614, the disclosure of which is incorporated herein by reference.

BACKGROUND OF THE INVENTION

1. Field of the Invention

The present invention relates generally to a system and method for transmitting and receiving secure information between Secure Removable Media (SRM) devices, and in particular, to a system and method for exchanging secure information between Open Mobile Alliance (OMA) SRM devices.

2. Description of the Related Art

Over time, the number of Internet users is constantly increasing and the commercial use of digital content is also increasing according to content digitalization. Consequently, there is also an increasing problem in that the digital content may not be protected because of the ease of digital content replication, the quality of digital content replication is not degraded, and basically anyone can unlawfully replicate and distribute the digital content. Thus, Digital Rights Management (DRM) has been developed as a technology for reporting the copyright of digital content, and for distributing and managing the copyright and digital content, such that ownership and copyright can be protected for a content provider or producer. This DRM technology enables a user to receive encrypted digital content, secure information such as a Rights Object (RO) of the corresponding digital content from a content provider, and then decode and use the encrypted digital content using the received RO information.

However, DRM technology has also creates a problem in that a user must again receive RO data of previously received contents because the RO data of previously received contents cannot be moved to a new terminal when the new terminal is used, for example, after purchasing a new terminal, while the data is stored and still useable in the replaced terminal. To solve this problem, an SRM technology has been developed to exchange RO data between a DRM device and a removable memory. In the SRM technology, an SRM device, such as the removable memory, receives the RO data from a DRM agent of a given terminal and then transfers the RO data to a DRM agent of another terminal. Thus, the user can use content received from a content provider using any terminal.

As described above, received contents may be conventionally used in any terminal by exchanging RO data of the contents between a DRM device and an SRM device. However, there is a problem in that secure information, such as RO information stored in an SRM device, must be initially sent to a DRM device, and then moved from the DRM device to an SRM device in order to move the RO information to another SRM device. Accordingly, a technology for more conveniently exchanging secure information between SRM devices is needed.

SUMMARY OF THE INVENTION

The present invention has been designed to address at least the problems and/or disadvantages above, and to provide at least the advantages as will be described below. Accordingly, an aspect of the present invention is to provide a system and method for exchanging secure information between SRM devices.

In accordance with an aspect of the present invention, a system for exchanging secure information between SRM devices is provided. The system includes a first SRM device that performs a mutual authentication operation with a second SRM device, exchanges a secret key for exchanging the secure information with the second SRM device, performs an installation setup operation to establish an environment for moving rights to the second SRM device along with the second SRM device, and transmits rights information to the second SRM device after the installation setup operation is completed; and the second SRM device that receives the rights information from the first SRM device.

In accordance with another aspect of the present invention, a method for exchanging secure information between SRM devices is provided. The method includes: performing, by a first SRM device, a mutual authentication operation with a second SRM device; exchanging, by the first SRM device, a secret key for exchanging the secure information with the second SRM device; performing, by the first SRM device, an installation setup operation to establish an environment for moving rights to the second SRM device along with the second SRM device; transmitting, by the first SRM device, rights information to the second SRM device after the installation setup operation is completed; and receiving, by the second SRM device, the rights information from the first SRM device.

BRIEF DESCRIPTION OF THE DRAWINGS

The above and other aspects, features, and advantages of the present invention will become more apparent from the following detailed description when taken in conjunction with the accompanying drawings in which.

DETAILED DESCRIPTION OF EMBODIMENTS OF THE PRESENT INVENTION

Figure 1:
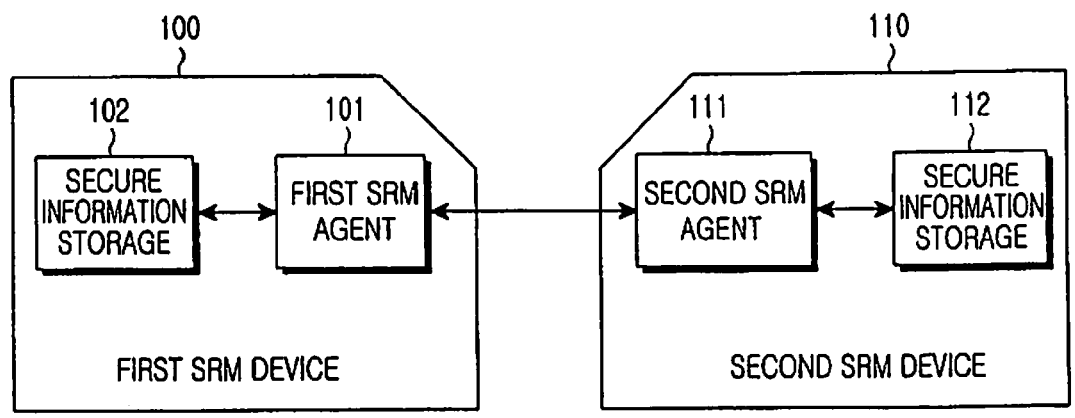
FIG. 1 is a diagram illustrating an SRM system according to an embodiment of the present invention.

Embodiments of the present invention will now be described in detail with reference to the annexed drawings. In the following description, a detailed description of known functions and configurations incorporated herein has been omitted for clarity and conciseness. Additionally, throughout the drawings, the same drawing reference numerals will be understood to refer to the same elements, features and structures.

FIG. 1 is a diagram illustrating an SRM system including SRM devices according to an embodiment of the present invention.

Referring to FIG. 1, the SRM system includes a first SRM device 100 and a second SRM device 110. The first SRM device 100 includes a first SRM agent 101 and a secure information storage 102. The second SRM device 110 includes a second SRM agent 111 and a secure information storage 112.

When a request for exchanging information with the second SRM device 110 is received, the first SRM agent 101 makes an initialization request for exchanging secure information with the second SRM device 110. Thereafter, when a response to the initialization request is received from the second SRM device 110, the first SRM agent 101 transmits a request for mutual authentication with the second SRM device 110 to the second SRM agent 111. When a response to the mutual authentication request is received from the second SRM device 110, the first SRM agent 101 transmits a secret random number exchange request for exchanging the secure information to the second SRM device 110. When a response to the secret random number exchange request is received from the second SRM device 110, the first SRM agent 101 requests the second SRM device 110 to update CRL information indicating a list of revocation certificates. When a response to the CRL update request is received from the second SRM device 110, the first SRM agent 101 makes an installation setup request to establish an environment for moving rights to the second SRM device 110. When a response to the installation setup request is received from the second SRM device 110, the first SRM agent 101 performs a right disablement process for disabling the rights. After the right disablement process, the first SRM agent 101 makes a rights installation request for moving the rights to the second SRM device 110. When a response to the rights installation request is received from the second SRM device 110, the first SRM agent 101 deletes the corresponding rights.

The secure information storage 102 stores secure information such as rights and use right data of digital contents, a certificate, CRL information, a secret random number, etc.

From the perspective of the second SRM, when the initialization request for exchanging secure information is received from the first SRM device 100, the second SRM agent 111 transmits the initialization response to the first SRM device 100. Thereafter, when the mutual authentication request is received from the first SRM device 100, the second SRM agent 111 makes the mutual authentication response. When the secret random number exchange request is received from the first SRM device 100, the second SRM agent 111 makes the response to the requested secret random number exchange. When the CRL information update request is received from the first SRM device 100, the second SRM agent 111 makes the response to the CRL information update request. When the installation setup request is received from the first SRM device 100, the second SRM agent 111 performs the installation setup operation to establish an environment for moving the rights of the first SRM device 100. Thereafter, the second SRM agent 111 transmits the response to the installation setup request to the first SRM agent 101. When the rights installation request is received from the first SRM device 100, i.e., when rights information are received from the first SRM device 100, the second SRM agent 111 makes the response to the rights installation request, after performing the rights installation operation to store the received rights information.

The secure information storage 112 stores secure information such as rights and use right data of digital contents, a certificate, CRL information, a secret random number, etc.

Figure 2:
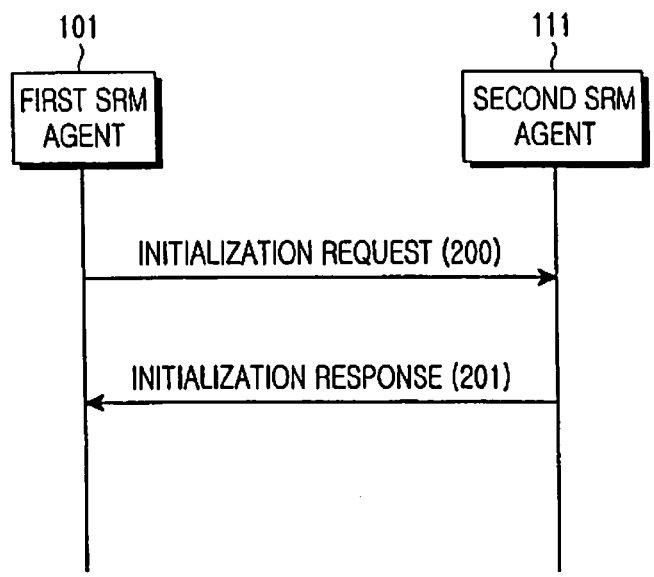
FIG. 2 is a flow diagram illustrating an initialization process between SRM devices according to an embodiment of the present invention.

FIG. 2 is a flow diagram illustrating initialization request and response message transmission between the first SRM agent 101 of the first SRM device 100 and the second SRM agent 111 of the second SRM device 110.

Referring to FIG. 2, in step 200, the first SRM agent 101 transmits an initialization request message for setting up a logical channel with the second SRM agent 111 to the second SRM device 110. The initialization request message is used to requests the exchange of secure information between the SRM devices.

More specifically, the initialization request message may include, for example, "SrmClientHelloRequest". When the first SRM device 100 transmits the "SrmClientHelloRequest" message, the first SRM device 100 operates as a client. Fields of the initialization request message, such as "SrmClientHelloRequest", may be configured as shown in Table 1.

TABLE 1

| Field | Protection Request | Description |
|---|---|---|
| Version | No | Version value |
| Trust Anchor And Client SRM Agent ID Pair List | No | Pairs of trust anchor and client SRM IDs. At least one SRM ID is possible. When there are multiple SRM IDs for one trust model, only one ID is shown. |

After receiving the initialization request message, in step 201, the second SRM agent 111 transmits an initialization response message to the first SRM device 100. More specifically, when the "SrmClientHelloRequest" message is received, the second SRM agent 111 selects a protocol version provided to the second SRM device 110. Thereafter, the second SRM agent 111 transmits a response message, such as "SrmClientHelloResponse", to the first SRM device 100. When the second SRM device 110 transmits the "SrmClientHelloResponse" message, the second SRM device 110 operates as a server. Fields of the initialization response message, such as "SrmClientHelloResponse", may be configured as shown in Table 2.

TABLE 2

| Field | Protection Request | Description |
|---|---|---|
| Status | No | The result for the request message is indicated as shown in Table 3. |
| Selected Version | No | Version selected by the server SRM agent |
| Trust Anchor And Server SRM Agent ID Pair List | No | Only ID pairs corresponding to trust anchor and client SRM ID pairs are shown in a trust anchor and server SRM ID pair list |
| Peer Key Identifier List | No | Client SRM ID list already verified by a server SRM |
| Max Number of AssetIDs | No | The maximum number of AssetIDs that can be processed in the server SRM agent for the "HandleListQueryRequest" message of OMA SRM 1.0 |
| Optional Message Supported | No | Information about an additional message supported by the SRM agent |

The response message of the second SRM agent 111, as described above, includes a status value as shown in Table 3.

TABLE 3

| Status Value | Description |
| --- | --- |
| Success | The request has been processed successfully. |
| Parameter Failed | The request field is invalid. |
| Unknown Error | Other errors |

When the received response message indicates "Success", the first SRM agent 101 continuously performs the next mutual authentication and secret random number exchange process.

Figure 3:
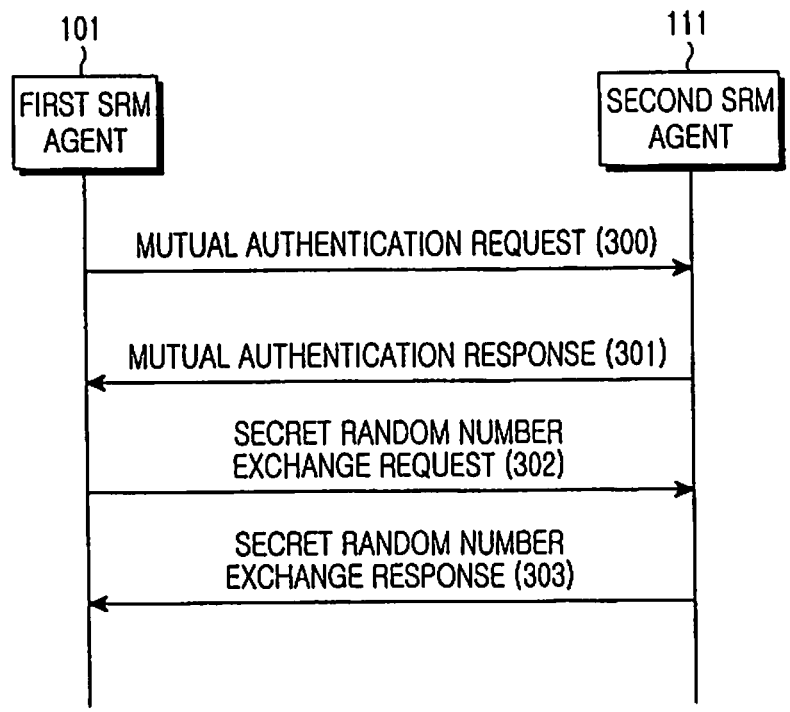
FIG. 3 is a flow diagram illustrating a mutual authentication process and secret random number exchange between the SRM devices according to an embodiment of the present invention.

FIG. 3 is a flow diagram illustrating a process for transmitting request and response messages for a mutual authentication and a secret random number exchange between the first SRM agent 101 of the first SRM device 100 and the second SRM agent 111 of the second SRM device 110.

Referring to FIG. 3, the first SRM agent 101 transmits a mutual authentication request message for starting the mutual authentication with the second SRM device 110 in step 300. For example, the first SRM agent 101 transmits the mutual authentication request message, such as "SrmClientAuthenticationRequest", including information of the first SRM device 100 for the mutual authentication and selection information, such as a certificate, to the second SRM device 110. Fields of the mutual authentication request message, such as "SrmClientAuthenticationRequest", may be configured as shown in Table 4.

TABLE 4

| Field | Protection Request | Description |
| --- | --- | --- |
| Trust Anchor | No | Trust anchor selected by a client SRM agent among trust anchor SRM ID pair values of "SrmClientHelloResponse" message fields |
| SRM Client Certification Chain | No | Client SRM certificate chain of the selected trust anchor. When a peer key identifier list of the "SrmClientHelloResponse" message does not have a client SRM ID, the above field value is not transmitted. |
| Peer Key Identifier | No | This is set when the client SRM agent has already verified the server SRM ID implied by the trust anchor indicated by the above message. |
| Supported Algorithms | No | Encryption algorithms capable of being supported by the client SRM agent |

When the "SrmClientAuthenticationRequest" message is received, the second SRM agent 111 transmits the mutual authentication response message to the first SRM device 100 in step 301. For example, the second SRM agent 111 transmits the mutual authentication response message, such as "SrmClientAuthenticationResponse", including the certificate of the second SRM agent 111 for the mutual authentication to the first SRM device 110.

In response to the mutual authentication request, the second SRM agent 111 checks whether a trust anchor is provided in the mutual authentication request. When the trust anchor is not provided, the status of the mutual authentication response message is set to "Trust Anchor Not Supported" and the mutual authentication response message with the set status is transmitted to the first SRM agent 101.

However, when the trust anchor exists, the second SRM agent 111 verifies an SRM client certification chain. When the SRM client certification chain is verifiable, the second SRM agent 111 selects an algorithm to be used from among encryption algorithms capable of being supported by the first SRM agent 101. Otherwise, the second SRM agent 111 sets the status of the mutual authentication response message to "SRM Client Certification Chain Verification Failed" and transmits the mutual authentication response message with the set status to the first SRM agent 101. When the SRM client certification chain does not exist, the second SRM agent 111 checks a peer key identifier.

When a peer key identifier list is not included in the mutual authentication response message, the second SRM agent 111 sets the status of the mutual authentication response message to "SRM Client Certification Chain Verification Failed" and transmits the mutual authentication response message with the set status to the first SRM agent 101. However, when the peer key identifier is included, the second SRM agent 111 checks whether the trust anchor of the peer key identifier list corresponds to another trust anchor. When the trust anchors do not correspond to each other, the status of the mutual authentication response message is set to "SRM Client Certification Chain Verification Failed" and the mutual authentication response message with the set status is transmitted to the first SRM agent 101. When the trust anchors do correspond to each other, the second SRM agent 111 checks the peer key identifier, determines whether to transmit the SRM client certification channel, and selects an algorithm to be used from among the encryption algorithms capable of being supported by the first SRM agent 101.

After the above-described operation is performed, the second SRM agent 111 transmits the mutual authentication response message including the operation result to the first SRM device 100 in step 301. As described above, for example, the second SRM agent 111 transmits the mutual authentication response message "SrmClientAuthenticationResponse" including a certificate of the second SRM agent 111 for the mutual authentication to the first SRM device 110. Fields of the mutual authentication response message, such as "SrmClientAuthenticationResponse", may be configured as shown in Table 5.

TABLE 5

| Field | Protection Request | Description |
| --- | --- | --- |
| Status | No | The result for the request message is indicated as shown in Table 6. |

TABLE 5-continued

| Field | Protection Request | Description |
|---|---|---|
| SRM Server Certificate Chain | No | Certificate channel of the server SRM. When a peer key identifier value of the request message has been set, the above field does not need to be included. |
| Encrypted AuthResp Data | No | Values of a random number (RNs) generated by the server SRM, a version (content of the "SrmClientHelloRequest" field), and an encryption algorithm (selected by the server SRM agent) are encrypted using a public key of the server SRM agent. |

As seen in Table 5, the mutual authentication response message of the second SRM agent 111 includes a status value as shown in Table 6.

TABLE 6

| Status Value | Description |
|---|---|
| Success | The request has been processed successfully. |
| Trust Anchor Not Supported | The trust anchor indicated in the request is not supported by the server SRM agent. |
| Device Certificate Chain Verification Failed | The server SRM agent does not verify the device certification chain. |
| Parameter Failed | The request field is invalid. |
| Unexpected Request | An unexpected request has been received. |
| Unknown Error | Other errors |

Referring to Table 6, when the received mutual authentication response message indicates "Success" and the certificate chain exists, the first SRM agent 101 verifies an SRM server certificate chain. When the first SRM agent 101 transmits a mutual authentication request message that does not include the peer key identifier and the certificate chain exists, the first SRM agent 101 terminates communication with the second SRM agent 111. After verification, the first SRM agent 101 encrypts a Random Number (RN) generated by the second SRM device 110, a version, and a selected encryption algorithm using a public key of the second SRM agent 111. Thereafter, the first SRM agent 101 compares a version value transmitted from the second SRM device 110 to a version value of an initialization request message and verifies whether the selected encryption algorithm is provided. When the selected algorithm is not provided, the first SRM agent 101 terminates communication with the second SRM agent 111. However, when the selected algorithm is provided, the first SRM agent 101 verifies the selected encryption algorithm using a selected Hash algorithm and then continuously performs the secret random number exchange process.

In step 302, the first SRM agent 101 transmits a secret random number exchange request message for exchanging a secret random number to the second SRM device 110. For example, the first SRM agent 101 transmits the secret random number exchange request message, such as "SrmClientKeyExchangeRequest", to the second SRM device 110. Fields of the secret random number exchange request message, such as "SrmClientKeyExchangeRequest", may be configured as shown in Table 7.

TABLE 7

| Field | Protection Request | Description |
|---|---|---|
| Encrypted KeyEx Data | No | RNc generated by the client SRM agent, RNs generated by the server SRM |

TABLE 7-continued

| Field | Protection Request | Description |
|---|---|---|
| | | agent, and version information are encrypted using a server SRM public key detected through the trust anchor of the "SrmClientAuthentication" message. |

When the "SrmClientKeyExchangeRequest" message is received, the second SRM agent 111 decrypts KeyEx data encrypted through the public key of the second SRM device 110. The second SRM agent 111 compares the decrypted Random Number to the random number of the second SRM agent 111 of the second SRM device 110. The second SRM agent 111 compares the decrypted version value to a version value of the initialization response message. After this operation, the second SRM agent 111 transmits a secret random number exchange response message including the operation result to the first SRM device 100 in step 303. For example, the second SRM agent 111 transmits the response message, such as "SrmClientKeyExchangeResponse", to the first SRM device 110. Fields of the secret random number exchange response message "SrmClientKeyExchangeResponse" may be configured as shown in Table 8.

TABLE 8

| Field | Protection Request | Description |
|---|---|---|
| Status | No | The result for the request message is indicated as shown in Table 9. |
| Hash Of RanNum Data | No | Value of RNs\|RNc computed using a selected Hash algorithm |

As described above, the result of the secret random number exchange response message of the second SRM agent 111 includes a status value as shown in Table 9.

TABLE 9

| Status Value | Description |
|---|---|
| Success | The request has been processed successfully. |
| Field Decryption Failed | The decryption of the encrypted field has failed. |
| SRM Random Number Mismatched | A random number value received from the client SRM agent is different from the original random number value generated by the server SRM agent. |
| Version Mismatched | A version received in the "SrmClientKeyExchangeRequest"message is different from that transmitted in the "SrmClientHelloResponse" message. |
| Parameter Failed | The request field is invalid. |
| Unexpected | An unexpected request has been received. |

TABLE 9-continued

| Status Value | Description |
| --- | --- |
| Request Unknown Error | Other errors |

When the received secret random number exchange response message indicates "Success", the first SRM agent 101 checks whether the Random Number generated by the first SRM device and the Random Number of the second SRM agent 111 generated by the second SRM device match the random numbers of the secret random number exchange request message and the mutual authentication response.

Figure 4:
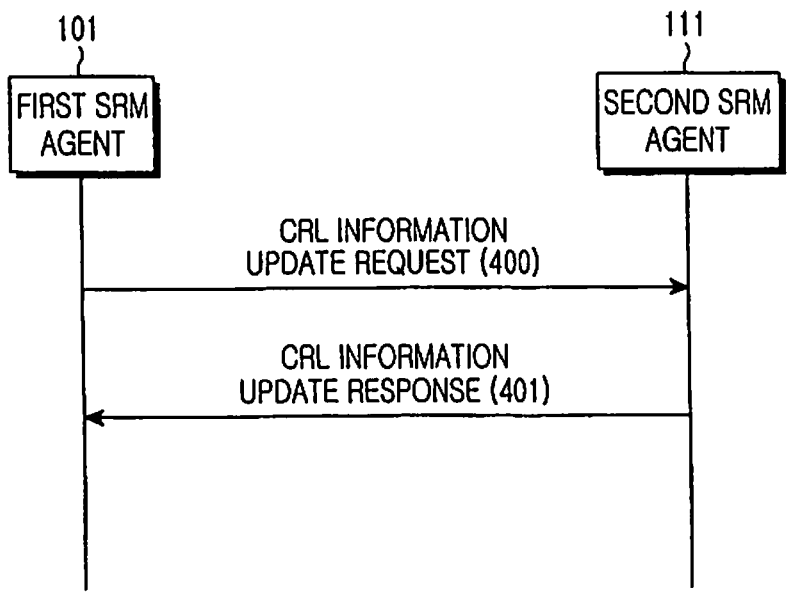
FIG. 4 is a flow diagram illustrating a Certificate Revocation List (CRL) information transmission and update between SRM devices according to an embodiment of the present invention.

FIG. 4 is a flow diagram illustrating a process for transmitting a request message and a response message to update CRL information between the first SRM agent 101 of the first SRM device 100 and the second SRM agent 111 of the second SRM 110.

Referring to FIG. 4, the first SRM agent 101 transmits the CRL information update request message to the second SRM device 110 in step 400. The CRL information indicates a list indicating whether a certificate has been discarded. That is, the first SRM agent 101 transmits the request message, such as "SrmClientCRLInformationExchangeRequest", including an information list for a CRL of the first SRM agent 101 to the second SRM device 110.

Fields of the CRL information update request message "SrmClientCRLInformationExchangeRequest" may be configured as shown in Table 10.

TABLE 10

| Field | Protection Request | Description |
| --- | --- | --- |
| Client CRL Information List | No | CRL information is a CRL issuer ID and a CRL number. A CRL information list is all CRL information existing in the client SRM. |

Upon receipt of the "SrmClientCRLInformationExchangeRequest" message, the second SRM agent 111 updates its own CRL information using the CRL information included in the received "SrmClientCRLInformationExchangeRequest" message. Accordingly, the first and second SRM devices can mutually share the latest CRL information.

Thereafter, the second SRM agent 111 transmits the CRL information update response message to the first SRM device 100 in step 401. For example, the second SRM agent 111 transmits "SrmClientCRLInformationExchangeResponse" to the first SRM device 110. Fields of the CRL information update response message "SrmClientCRLInformationExchangeResponse" may be configured as shown in Table 11.

TABLE 11

| Field | Protection Request | Description |
| --- | --- | --- |
| Status | No | A result for the request message is indicated as shown in Table 12. |
| Server CRL Information List | No | CRL information is a CRL issuer ID and a CRL number. A CRL information list is all CRL information existing in the server SRM. |

As described above, the CRL information update response message of the second SRM agent includes a status value as shown in Table 12.

TABLE 12

| Status Value | Description |
| --- | --- |
| Success | The request has been processed successfully. |
| Parameter Failed | The request field is invalid. |
| Unexpected Request | An unexpected request has been received. |
| Unknown Error | Other errors |

When the received CRL information update response message indicates "Success", the first SRM agent 101 compares the CRL information list of the second SRM device 110 included in the received response message to constituent elements for the first SRM agent 101. When a CRL Issuer IDentification (ID) is identical, the first SRM agent 101 may replace the CRL of the second SRM device 110 and the CRL of the first SRM device 100 or perform a comparison operation to determine whether the CRL of the first SRM device 100 and the CRL of the second SRM device 110 can be replaced. When the CRL of the first SRM device 100 and the CRL of the second SRM device 110 from the same CRL issuer can be replaced, the first SRM agent 101 transmits a new CRL to the second SRM agent 110. When the CRL of the first SRM device 100 and the CRL of the second SRM device 110 from the same CRL issuer can be replaced, the first SRM agent 101 receives a new CRL from the second SRM agent 110.

Figure 5:
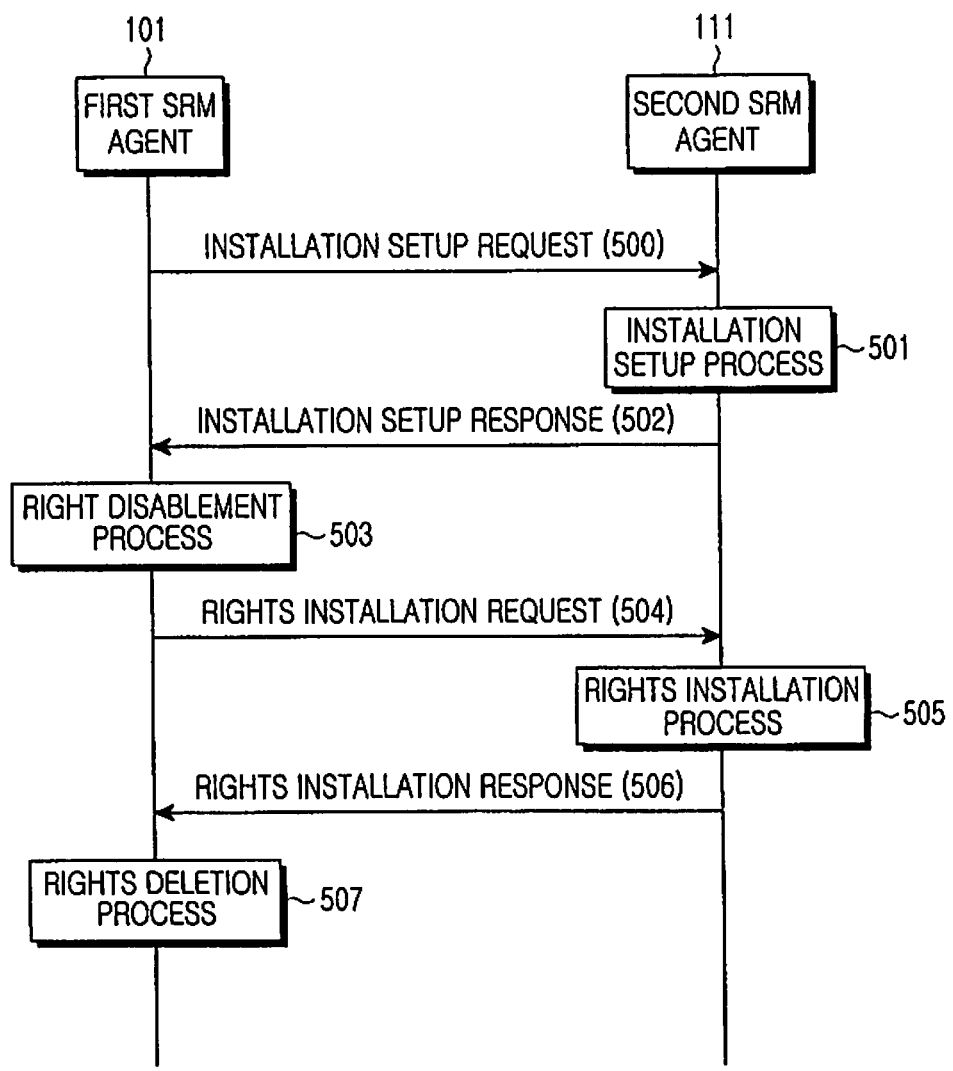
FIG. 5 is a flow diagram illustrating a rights installation setup and a rights installation according to an embodiment of the present invention.

FIG. 5 is a flow diagram illustrating a rights installation setup and a rights installation according to an embodiment of the present invention.

Referring to FIG. 5, the first SRM agent 101 transmits an installation setup request message to establish an environment for moving rights to the second SRM device 110 in step 500. For example, the first SRM agent 101 transmits the request message "SrmClientInstallationSetupRequest" to the second SRM device 110. Fields of the installation setup request message "SrmClientInstallationSetupRequest" may be configured as shown in the following Table 13.

TABLE 13

| Field | Protection Request | Description |
| --- | --- | --- |
| Handle | Integrity & Confidentiality | Handle value generated by the client SRM agent to perform a move process for discriminating rights |
| Size of Rights | Integrity | Size of rights information stored in the SRM Server |

When the "SrnClientInstallationSetupRequest" message is received, the second SRM agent 111 performs an installation setup process in step 501.

In step 501, the second SRM agent 111 verifies the integrity of the fields of the installation setup request message and decrypts a handle value along with a session key. The second SRM agent 111 checks whether the same handle value already exists in the second SRM device. When the same handle value exists, the second SRM agent 111 sets the status of the installation setup response message to "Duplicate Handle" and transmits the installation setup response message with the set status to the first SRM device 100. Thereafter, the second SRM agent 111 checks whether the second SRM device 110 has a space for storing a new rights value. When the space for storing the new rights value is not provided, the second SRM agent 111 sets the status of the installation setup response message to "Not Enough" and transmits the installation setup response message with the set status to the first SRM device 100. However, when the space for storing the new rights value is provided, the second SRM agent 111 securely stores the handle value in the secure information storage 112.

Thereafter, the second SRM agent 111 transmits the installation setup response message including the installation setup process result to the first SRM device 100 in step 502. For example, the second SRM agent 111 transmits the response message "SrmClientInstallationSetupResponse" to the first SRM agent 101. Fields of the installation setup response message "SrmClientInstallationSetupResponse" may be configured as shown in Table 14.

TABLE 14

| Field | Protection Request | Description |
| --- | --- | --- |
| Status | Integrity | The result for the request message is indicated as shown in Table 15. |

As described above, the installation setup response message of the second SRM agent 111 includes a status value as shown in Table 15.

TABLE 15

| Status Value | Description |
| --- | --- |
| Success | The request has been processed successfully. |
| Field Integrity Verification Failed | An HMAC value of the "SrmClientInstallationSetupRequest" field is different from a value computed by the server SRM agent. |
| Duplicate Handle | A handle value of rights information to be transmitted already exists in the server SRM. |
| Not Enough Space | The space for storing rights information received from the client in the server SRM is not enough. |
| Parameter Failed | The request field is invalid. |
| Unexpected Request | An unexpected request has been received. |
| Unknown Error | Other errors |

When the installation setup response message is received, the first SRM agent 101 verifies the integrity of the fields of the installation setup response message. When the received installation setup response message indicates "Success", the first SRM agent 101 performs a right disablement process such that the rights cannot be used in the first SRM device 100 in step 503. The disabled rights cannot be used for other purposes except for the present movement. After the right disablement process, the first SRM agent 101 copies corresponding rights information and transmits a rights installation request message including the copied rights information to the second SRM agent 111 in step 504. For example, the first SRM agent 101 transmits the rights installation request message "SrmClientRightsInstallationRequest" including the rights information to the second SRM agent 100. Fields of the rights installation request message "SrmClientRightsInstallationRequest" may be configured as shown in Table 16.

TABLE 16

| Field | Protection Request | Description |
| --- | --- | --- |
| Handle | Integrity & Confidentiality | Same value as a handle value transmitted in the "SrmClientInstallationSetupRequest" message |
| REK | Integrity & Confidentiality | Rights Object Encryption Key |

TABLE 16-continued

| Field | Protection Request | Description |
| --- | --- | --- |
| LAID | Integrity | List of Hash values of asset identifiers |
| Rights Information | Integrity | Rights information including rights meta data, rights object container, and status Information |

When the "SrmClientRightsInstallationRequest" message is received, the second SRM agent 111 stores received rights information in the secure information storage 112 of the second SRM device 110 in step 505.

In step 505, the second SRM agent 111 verifies the integrity of the fields of the request message and decodes a handle value and an REK value along with a session key. Thereafter, the second SRM agent 111 compares the decoded handle value to the handle value of the installation setup request message, and installs the rights information value and the PEK value in a space relating to the handle value.

The second SRM agent 111 transmits the rights installation response message including the rights installation operation result to the first SRM device 100 in step 506. For example, the second SRM agent 111 transmits the response message "SrmClientInstallationSetupResponse" to the first SRM agent 101. Fields of the rights installation response message "SrmClientRightsInstallationResponse" may be configured as shown in Table 17.

TABLE 17

| Field | Protection Request | Description |
| --- | --- | --- |
| Status | Integrity | The result for the request message is indicated as shown in Table 18. |

As described above, the result of the rights installation response message of the second SRM agent 111 includes a status value as shown in Table 18.

TABLE 18

| Status Value | Description |
| --- | --- |
| Success | The request has been processed successfully. |
| Field Integrity Verification Failed | An HMAC value of the "SrmClientRightInstallationRequest" field is different from a value computed by the server SRM agent. |
| Handle Not Found | A handle value does not exist in the "SrmClientRightInstallationRequest" message. |
| Handles Inconsistent | A handle value of the "SrmClientRightInstallationRequest" message is different from a handle value of the "SrmClientInstallationSetupRequest" message. |
| Not Enough Space | A space for storing the rights information in the server SRM agent is not enough. |
| Parameter Failed | The request field is invalid. |
| Unexpected Request | An unexpected request has been received. |
| Unknown Error | Other errors |

When the rights installation response message is received, the first SRM agent 101 verifies the integrity of the fields of the received rights installation response message. When the received rights installation response message indicates "Success", the first SRM agent 101 deletes rights information stored in the secure information storage 102 of the first SRM device 100 in step 507. When a rights deletion operation is completed, the movement between the first SRM device and the second SRM device is terminated.

In the embodiments of the present invention as described above, the first SRM agent 101 performs a client operation and the second SRM agent 111 performs a server operation. Alternatively, the secure information exchange method according to the present invention may be used even when the first SRM agent 101 performs the server operation and the second SRM agent 111 performs the client operation.

The embodiments of the present invention have an advantage over the prior art in that secure information can be directly exchanged between SRM devices, without exchanging secure information via a DRM device upon secure information exchange between the SRM devices.

While the preferred invention has been shown and described with reference to certain embodiments thereof, it will be understood by those skilled in the art that various changes in form and details may be made therein without departing from the spirit and scope of the present invention as defined by the appended claims.

What is claimed is:

1. A Secure Removable Media (SRM) device for exchanging secure information between SRM devices, the SRM device comprising:
   a secure information storage that stores secure information including rights information; and
   a first SRM agent that performs a mutual authentication operation with a second SRM device, exchanges a secret key for exchanging the secure information with the second SRM device, performs an installation setup operation to establish an environment for moving the rights information to the second SRM device, performs a rights disablement process such that rights associated with the rights information cannot be used for other purposes except moving the rights information when the installation setup of the second SRM device is available, and transmits the rights information to the second SRM device.

2. The SRM device of claim 1, wherein the first SRM agent performs an initialization operation to start the secure information exchange with the second SRM device before performing the mutual authentication operation.

3. The SRM device of claim 2, wherein the first SRM agent transmits an "SrmClientHelloRequest" message to the second SRM device for requesting the initialization operation.

4. The SRM device of claim 3, wherein the first SRM agent transmits an "SrmClientCRLInformationExchangeRequest" message to the second SRM device including Certificate Revocation List (CRL) information.

5. The SRM device of claim 1, wherein the first SRM agent transmits Certificate Revocation List (CRL) information indicating certificate revocation for sharing a latest certificate with the second SRM device, after exchanging the secret key with the second SRM device.

6. The SRM device of claim 1, wherein the first SRM agent deletes the rights information after transmitting the rights information to the second SRM device.

7. The SRM device of claim 1, wherein the first SRM agent transmits an "SrmClientAuthenticationRequest" message to the second SRM device for requesting the mutual authentication operation.

8. The SRM device of claim 1, wherein the first SRM agent transmits an "SrmClientKeyExchangeRequest" message including its own secret key for requesting the secret key exchange to the second SRM device.

9. The SRM device of claim 1, wherein the first SRM agent transmits an "SrmClientInstallationSetupRequest" message including the rights information to the second SRM device for requesting the installation setup operation.

10. A method for exchanging secure information between Secure Removable Media (SRM) devices in a first SRM device, comprising:
    performing, by the first SRM agent, a mutual authentication operation with a second SRM device;
    exchanging, by the first SRM agent, a secret key for exchanging the secure information with the second SRM device;
    performing, by the first SRM agent, an installation setup operation to establish an environment for moving rights to the second SRM device; and
    transmitting, by the first SRM agent, rights information to the second SRM device,
    wherein performing, by the first SRM agent, the installation setup operation comprises performing, by the first SRM agent, a rights disablement process such that rights associated with the rights information cannot be used for other purposes except moving the rights information when the installation setup of the second SRM device is available.

11. The method of claim 10, further comprising:
    performing an initialization operation to start the secure information exchange with the second SRM device before performing the mutual authentication operation.

12. The method of claim 11, wherein performing the initialization operation comprises:
    transmitting an "SrmClientHelloRequest" message to the second SRM device for requesting the initialization operation.

13. The method of claim 10, further comprising:
    transmitting Certificate Revocation List (CRL) information indicating certificate revocation for sharing a latest certificate with the second SRM device, after exchanging the secret key with the second SRM device.

14. The method of claim 13, wherein transmitting the CRL information comprises:
    transmitting an "SrmClientCRLInformationExchangeRequest" message including the CRL information to the second SRM device.

15. The method of claim 10, wherein performing the mutual authentication operation comprises:
    transmitting an "SrmClientAuthenticationRequest" message to the second SRM device for requesting the mutual authentication operation.

16. The method of claim 10, wherein exchanging the secret key comprises:
    transmitting an "SrmClientKeyExchangeRequest" message including its own secret key for requesting the secret key exchange from the second SRM device.

17. The method of claim 10, wherein performing the installation setup operation comprises:
    transmitting an "SrmClientInstallationSetupRequest" message to the second SRM device for requesting the installation setup operation.

18. The method of claim 10, wherein transmitting the rights information comprises:
    transmitting an "SrmClientRightsInstallationRequest" message including the rights information to the second SRM device; and
    deleting the rights information, after the rights information is transmitted completely.

* * * * *